(12) United States Patent
Brandão et al.

(10) Patent No.: US 12,417,426 B2
(45) Date of Patent: Sep. 16, 2025

(54) SYSTEMS AND METHODS FOR COMPUTER MEMORY OPTIMIZATION FOR THE STORAGE OF DELIVERY TIME INFORMATION FOR A PRODUCT SOLD ONLINE

(71) Applicant: SHOPIFY INC., Ottawa (CA)

(72) Inventors: Débora Setton Brandão, Montreal (CA); George Tzavelas, Carp (CA); Linda Damus, Ottawa (CA); Lin Zhao, Kanata (CA); Djoume Salvetti, Ottawa (CA)

(73) Assignee: SHOPIFY INC., Ottawa (CA)

( * ) Notice: Subject to any disclaimer, the term of this patent is extended or adjusted under 35 U.S.C. 154(b) by 197 days.

(21) Appl. No.: 17/983,945

(22) Filed: Nov. 9, 2022

(65) Prior Publication Data
US 2024/0062142 A1    Feb. 22, 2024

Related U.S. Application Data

(60) Provisional application No. 63/398,255, filed on Aug. 16, 2022.

(51) Int. Cl.
    *G06Q 10/0833* (2023.01)
(52) U.S. Cl.
    CPC ............................. *G06Q 10/0833* (2013.01)
(58) Field of Classification Search
    CPC ... G06Q 10/083; G06Q 10/087; H04W 4/029; G06F 9/451; G06F 3/04812; G06F 3/0487; H04L 67/18
    USPC ........................................................ 705/330
    See application file for complete search history.

(56) References Cited

U.S. PATENT DOCUMENTS

| | | | |
|---|---|---|---|
| 8,666,846 B1 * | 3/2014 | Chenault | G06Q 10/087 705/28 |
| 11,526,831 B1 * | 12/2022 | Rafii | G06F 3/0487 |
| 11,593,751 B2 * | 2/2023 | Shiely | G06Q 10/06311 |
| 11,893,751 B2 * | 2/2024 | Ansari | G06T 7/74 |
| 2020/0090119 A1 * | 3/2020 | Shiely | G06Q 30/0625 |

OTHER PUBLICATIONS

"Consumer Marketing Strategy and E-Commerce in the Last Decade: A Literature Review" Published by Journal of Theoretical and Applied Electronic Commerce Research (Year: 2021).*

* cited by examiner

*Primary Examiner* — Zeina Elchanti
(74) *Attorney, Agent, or Firm* — Hickman Becker Bingham Ledesma LLP; Stephen R. Tkacs

(57) ABSTRACT

In e-commerce, web content (such as a checkout page) may include delivery time information associated with a product. To obtain the delivery time information, the computer may send an application programming interface (API) request to the fulfillment network. However, a fulfillment network is often delayed in responding to an API request. Also, there may be data privacy concerns with this approach. Alternatively, precomputed delivery time information may be sent from the fulfillment network, but this may result in a large amount of data that must be stored. In some embodiments, a data structure may be generated that includes a product-to-schedule mapping and a set of delivery schedule tables. Each of the delivery schedule tables may be based on a respective different set of one or more categories to which multiple ones of a plurality of products map. Computer memory resources may be saved.

23 Claims, 11 Drawing Sheets

| E-Commerce Platform | Q Search | JG John's Apparel / Jonny B. Good |
|---|---|---|
| ⌂ Home<br>⇄ Orders<br>◇ Products<br>○+ Customers<br>⊞ Reports<br>✧ Discounts<br>⊞ Apps<br>SALES CHANNELS ⊕<br>▣ Online Store<br>▢ Mobile App<br>View all channels<br><br>⚙ Settings | Good afternoon, Jonny B..<br>Here's what's happening with your store today.<br><br>Today's total sales    Today's visits<br>$98.00                          1<br><br>● Update your Platform Payments tax details<br>We require additional information to verify your identity.<br>[Update tax details]<br><br>● Advanced Cash on Delivery has been deactivated for your store<br>[See why] | All channels ⌄         Today ⌄<br><br>TOTAL SALES                    Jun 1<br>$98.00                          2 orders<br><br>$125<br>$75 ────────────────────<br>$25 ┈┈┈┈┈┈┈┈━━━┈┈┈┈┈<br>    12am  8pm  4pm  11pm<br><br>TOTAL SALES BY CHANNEL   View dashboard<br><br>Online Store                    Jun 1<br>$0.00                           0 orders<br><br>Mobile app<br>$0.00                           0 orders<br><br>Shopify POS (126 York St.)<br>$0.00                           0 orders |

SYSTEMS AND METHODS FOR COMPUTER MEMORY OPTIMIZATION FOR THE STORAGE OF DELIVERY TIME INFORMATION FOR A PRODUCT SOLD ONLINE

The present application claims the benefit under 35 U.S.C § 119(e) of U.S. Provisional Patent Application Ser. No. 63/398,255, entitled "Systems and Methods for Computer Memory Optimization for the Storage of Delivery Time Information for a Product Sold Online", which was filed on Aug. 16, 2022, and which is incorporated herein by reference.

FIELD

The present application relates to computer memory optimization for storage of delivery time information in e-commerce.

BACKGROUND

In an e-commerce system, a user can purchase an item that is physically located far away from the user. The product may be shipped to the user. The delivery time, i.e., the time between the purchase of the product by the user and the arrival of the product at the destination address chosen by the user, can vary depending on many factors.

When a user is interacting with the web content of an online store or online marketplace, it is sometimes desirable for the web content to display information related to the delivery time of the product. For example, when a user requests a product page (i.e., a web page that conveys information related to a product offered for sale), it may be desired that the returned web content include information related to the delivery time of that product. In another example, during an online checkout process it may be desired that the generated web content includes information related to delivery time of the product.

SUMMARY

The information related to the delivery time of a product sold online needs to be reliable. For example, the information might form the basis of a delivery promise provided to a user ahead of purchase on a product page, e.g. "Purchase now and receive the product by Wednesday". As another example, the information might form the basis of a delivery promise provided to a user on a "checkout" page.

Some of the information required to compute delivery time information may not be known or inferable until immediately before the delivery time information must be generated. For example, a request for web content received from a user device may provide some of the information required for the computation of the delivery time information, e.g. the request may include an identification of the product and/or information used to determine a destination address associated with the user. Since the web content rendered must include the delivery time information, the computation must be executed in the time between receiving the request for the web content and returning the web content, which in the context of online web browsing is a very small window.

For example, a user may click a hyperlink for a product page. The request for the product page (e.g. HTTP or HTTPS request) sent from the user device may include an identity of the product. The identity may be or map to a stock keeping unit (SKU) number for that product. In response, the computer generating the web content needs to retrieve the identity of the product from the request (because it is not known in advance of receiving the request), and then compute delivery time information. The computer then needs to include that delivery time information in response to the request so that the loaded webpage on the user device includes the delivery time information.

An e-commerce system may work with a fulfillment network, which may be an integrated fulfillment service or may be provided by one or more third-party logistics providers (3PLs). A fulfillment network may manage the storage of inventory, as well as the shipping and delivery of products that are purchasable using the e-commerce system. For example, the e-commerce system may host the online store of a first merchant whose products are managed by a first 3PL, and may host the online store of a second merchant whose products are managed by a second, different 3PL. For a given product sold on the e-commerce system, the fulfillment network responsible for the delivery of that product may be responsible for computing delivery time information, and upon purchase of that product by a user, ensuring that the product is delivered according to the delivery time information. Accordingly, the computer generating web content for a user may request delivery time information from the fulfillment network, so that an accurate delivery promise may be surfaced to a user on the e-commerce platform regarding the product.

The computer generating the web content is faced with the following technical problems. To be able to display delivery time information associated with a product to a user as part of web content, the computer may send an application programming interface (API) request to the fulfillment network responsible for delivering the product. The API request may contain information required for the fulfillment network to be able to compute the delivery time information, such as an identifier for the product and an indication of the shipping destination (e.g. a destination address or area of the user). At least some of this information sent in the API request may originate from the information in the request for web content received from the user. The response from the API request is incorporated into the web content returned to the user. However, a fulfillment network is often delayed in responding to such an API request, leading to a delay in generating and displaying the web content. Even a delay of two seconds to receive a reply to the API request may be too long in the context of web browsing in real-time in which the user expects immediate return of requested web content. This in turn may result in user frustration and/or a loss of customer or transaction.

Moreover, there may be data privacy concerns related to sending API requests to a fulfillment network, such as a 3PL, before users have actually purchased products on the e-commerce platform. For example, if the computer sends an API request when a user simply clicks on a product page or adds an item to their online "cart", the fulfillment network receiving the API request would implicitly gain knowledge about products that are of interest to users of the e-commerce platform. This may be undesirable both from the perspective of the user and the online store or commerce platform on which the user is performing their online shopping.

To address the issues related to delayed API request responses and privacy, the computer may, for each product available on an e-commerce platform, request for the fulfillment network responsible for the delivery of the product to precompute delivery time information and send that information to the computer. A product may have multiple product variants, for example a product that is available in different sizes and colors. In this case, each product variant might or might not be considered a different product when tracking inventory and requesting delivery time information, depending upon the implementation. The delivery time information may be received by the computer and stored in memory for quick access when generating web content. However, this results in a large amount of data that must be stored by the computer. In particular, for each product available on the e-commerce platform, the fulfillment network must compute the delivery time information associated with every possible destination address or area. For each product available on the e-commerce platform, there would need to be at least one data table (or equivalent structure) containing information related to delivery time for every possible destination address or area. There may even be multiple tables per product, e.g., one for each fulfillment center at which the product is stocked. The number of tables received by the computer would therefore be equal to or greater than the number of products available for purchase on the e-commerce platform, and they would all need to be stored locally for quick access, e.g. in a fast-access cache or random access memory (RAM). As the number of products available on the e-commerce platform grows, and may reach into the millions or tens of millions, the amount of data that must be stored by the computer may be too large to be stored locally, and may need to be stored in the computer's long-term memory, which may take longer to retrieve, and thereby add further to the delay when loading web content for a user. Further, since delivery time information must be frequently updated (e.g., as the expiry deadline for a delivery promise is passed), these large volumes of data must be continually received and stored by the computer. This also poses a data transmission problem between the fulfillment network and computer due to the large volume of data having to be continually re-sent.

Therefore, there is a need for a system which can more quickly and dynamically incorporate reliable delivery time information into web content transmitted to a user of an e-commerce platform, without requiring so much data to be continually sent by the fulfillment network and locally stored, and while still addressing issues related to delayed API request responses and privacy.

In some embodiments, a data structure may be generated. The data structure may include a product-to-schedule mapping, and a set of delivery schedule tables. The data structure may be generated and sent by a fulfillment network, received and stored by the computer generating web content, and used by the computer during web browsing to quickly generate reliable delivery time information based on data in a request for web content.

In some embodiments, the data structure may be stored in a contiguous portion of memory. In other embodiments, one or more portions of the data structure (e.g., a delivery schedule table) might not be stored in contiguous memory, e.g. storage of the data structure may be distributed. In some embodiments, some or all of the data structure (e.g. a delivery schedule table) may be represented as a linked list or binary tree.

The delivery schedule tables, which may be lookup tables, may be computed and generated based on categories which can be applied to all products, such as weight classes, dimensions, fulfillment center locations, etc. For example, a fulfillment network may decide to categorize products by weight class and available fulfillment center locations (e.g. by creating and using intermediate mappings between, e.g., product and weight class, and product and available fulfillment center locations). The number of delivery schedule tables may then correspond to the number of weight class and fulfillment center combinations. The number of delivery schedule tables in the data structure may be relatively small when compared to the number of purchasable products on the e-commerce platform. As a result, the storing and updating of the delivery schedule tables may take up much less data than the alternative of storing and updating delivery schedule tables where each purchasable product has its own unique one or more delivery schedule tables. Accordingly, by grouping products into different categories (e.g., different weight categories and/or different inventory location categories) having similar delivery timeframes, there may be a much smaller set of delivery schedule tables. This smaller set of delivery schedule tables is more compact and so may be more easily stored in local memory as compared to the alternative, and result in much less data to be transferred over a network from the fulfillment network.

The product-to-schedule mapping may map an identifier for a product (e.g., an SKU number of the product) to a delivery schedule table. When the computer requires delivery time information for a product, the computer may use the product-to-schedule mapping information to know which delivery schedule table should be consulted to find the delivery time information for that product.

In some embodiments, there is provided a computer-implemented method. The method may include a step of receiving, from a user device over a network, a request for web content associated with one of a plurality of products sold on an e-commerce platform. The method may further include a step of replying to the request. The replying step may include extracting, from a data structure, delivery schedule information for the one product. The data structure may include a plurality of delivery schedule tables, and a mapping of each of the plurality of products sold on the e-commerce platform to a respective one of the plurality of delivery schedule tables. Each of the plurality of delivery schedule tables may be based on a respective different set of one or more categories to which multiple ones of the plurality of products map. The replying step may further include, based on the delivery schedule information extracted from the data structure, generating an indication including delivery time information relating to the one product. The replying step may further include incorporating the indication into the web content, and transmitting the web content over the network for display on the user device.

In some embodiments, a total number of the plurality of delivery schedule tables may be less than a total number of the plurality of products sold on the e-commerce platform. In some embodiments, the replying may occur within a timing constraint associated with providing the web content during a user's real-time online interaction with the e-commerce platform. In some embodiments, the replying step may further include obtaining, from the request for web content, information related to a delivery destination associated with the user device, and the delivery destination may be used to extract the delivery schedule information from the data structure during the replying. In some embodiments, the information related to the delivery destination associated with the user device may be an Internet Protocol address of the user device.

In some embodiments, the replying step may include obtaining, from the request for web content, an identifier that uniquely identifies the one of the plurality of products. The identifier may be used to extract the delivery schedule information from the data structure during the replying step.

In some embodiments, the replying step may include obtaining, from the request for content, information related to a delivery destination associated with the user device and an identifier that uniquely identifies the one of the plurality of products. The extracting may include using the identifier to consult the mapping of each of the plurality of products to the respective one of the plurality of delivery schedule tables, to determine a delivery schedule table of the plurality of delivery schedule tables that corresponds with the one of the plurality of products. The extracting may further include using the delivery destination to extract the delivery schedule information from the delivery schedule table.

In some embodiments, different delivery schedule tables may correspond to different product characteristic categories. In some embodiments, the different product characteristic categories may include different weight categories, each of the weight categories defining a different weight range. In some embodiments, different delivery schedule tables may correspond to different fulfillment center location categories.

In some embodiments, the plurality of delivery schedule tables and the mapping may be updated to reflect a most current version of the plurality of delivery schedule tables and a most current version of the mapping. In some embodiments, the update of the delivery schedule tables may occur at a different frequency from the update of the mapping. In some embodiments, at least one of the plurality of delivery schedule tables may be updated in response to expired delivery time information, and the mapping may be updated in response to a particular inventory change.

In some embodiments, in response to inventory for a particular product at a particular fulfillment center dropping to zero or dropping below a threshold, the mapping may be updated to no longer map the particular product to the respective delivery schedule table to which the particular product was mapped. In some embodiments, the particular product may instead be mapped to a different delivery schedule table.

A system is also disclosed that is configured to perform the methods disclosed herein. For example, the system may include at least one processor to directly perform (or instruct the system to perform) the method steps, e.g. when the at least one processor executes instructions stored in memory. The system may further include memory to store the data structure.

In some embodiments, there is provided a computer readable medium having stored thereon computer-executable instructions that, when executed by a computer, cause the computer to perform operations of the methods disclosed herein. The computer readable medium may be non-transitory.

BRIEF DESCRIPTION OF THE DRAWINGS

Embodiments will be described, by way of example only, with reference to the accompanying figures wherein:

FIG. 2 is an example of a home page of an administrator, according to some embodiments.

FIGS. 9-11 illustrate example web pages which may be provided to a user via a user interface of a user device, according to some embodiments.

DETAILED DESCRIPTION

For illustrative purposes, specific embodiments will now be explained in greater detail below in conjunction with the figures.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
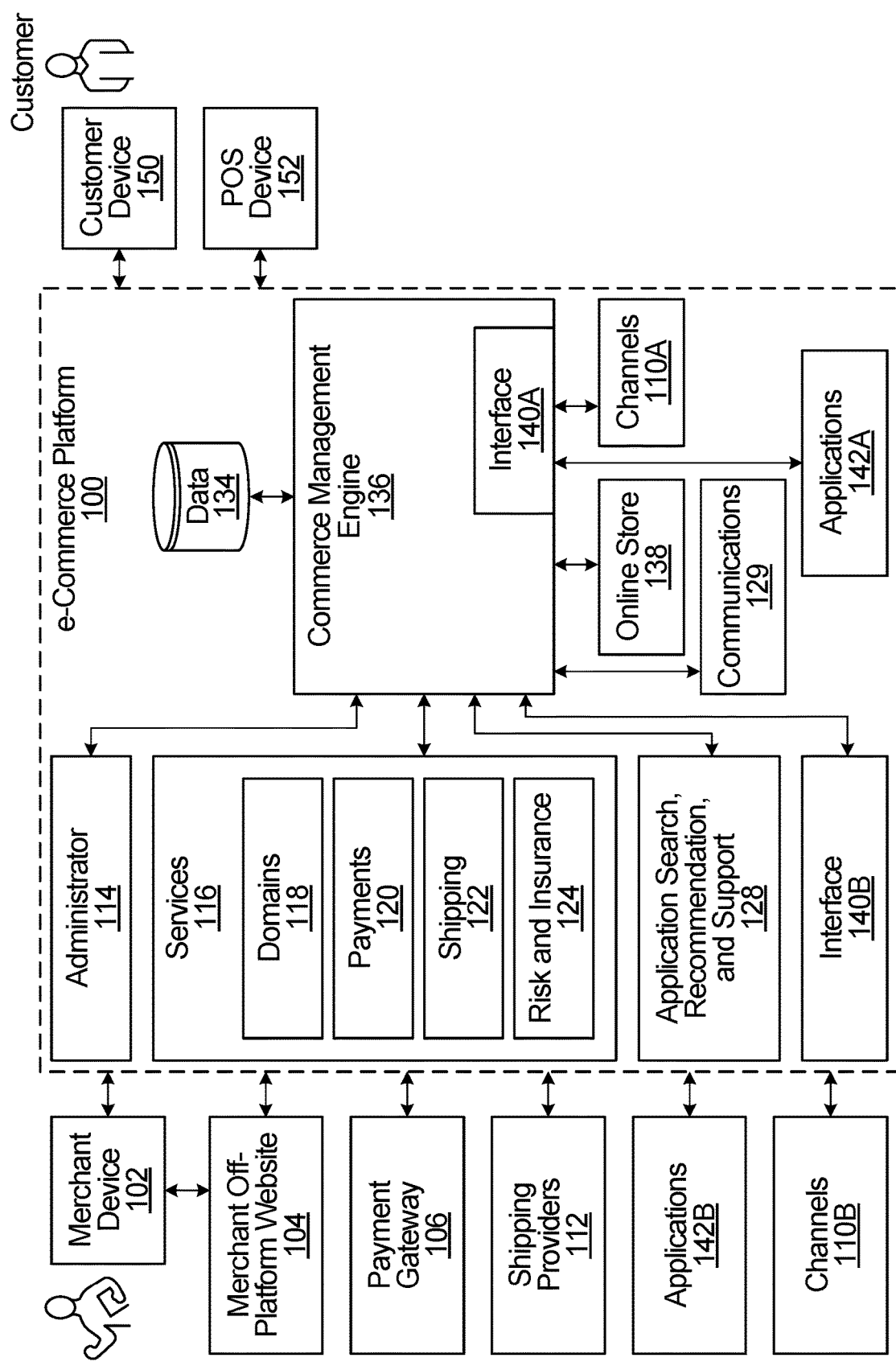
FIG. 1 is a block diagram of an e-commerce platform, according to some embodiments.

FIG. 1 illustrates an example e-commerce platform 100, according to some embodiments. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback uniform resource locator (URL). The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In some embodiments, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Generating Delivery Time Information for a Product Sold Online in the e-Commerce Platform 100

In the context of browsing through an online shop, a customer may wish to know an amount of time required for a product that may be purchased online to be delivered to them. The expected delivery time may influence the customer's decision to purchase the product from a particular online merchant for various reasons, for example due to the expectation of receiving a product within a particular timeframe, or due to needing the product before a certain date or event. As such, a system for generating delivery time information might allow for delivery time information, such as a delivery promise or an expected delivery time, to be provided to the customer while, for instance, browsing a product page of an online store/marketplace, and/or within channels relating to selling via a search engine or social media, and/or while completing an online checkout process. The preceding list is not limiting, and delivery promise or expected delivery time may also be provided to the customer elsewhere while online.

As mentioned previously, there are various technical challenges to being able to provide timely delivery time information. Some of the information required to compute delivery time information may not be known or inferable until immediately before the delivery time information must be generated. While an API request may be sent to a fulfillment network responsible for managing and delivering the product, the fulfillment network is often delayed in returning the API. The API response may be too slow in the context of browsing, which may discourage users from continuing their online shopping. Additionally, there may be data privacy concerns related to sending API requests to a fulfillment network before users have actually purchased products on the e-commerce platform. While a potential solution may be for the e-commerce platform to request from the fulfillment network precomputed delivery time information, as mentioned previously this creates additional issues related to storage, efficiency, transmission, and delays.

Figure 3:
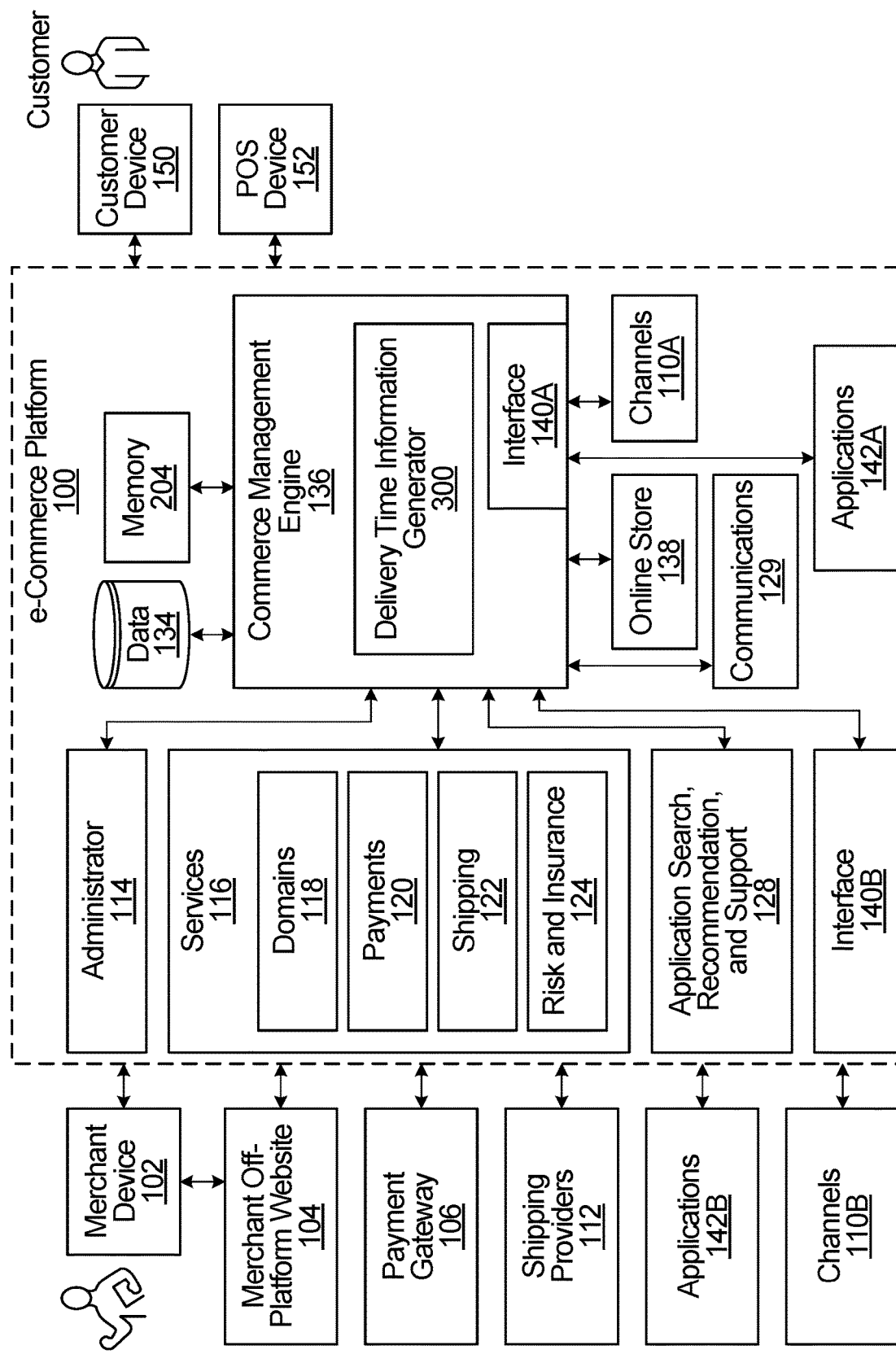
FIG. 3 illustrates the e-commerce platform of FIG. 1, but including a delivery time information generator.

FIG. 3 illustrates the e-commerce platform 100 of FIG. 1, but with the additions of a delivery time information generator 300 and a memory 204. The delivery time information generator 300 may be embodied as part of the commerce management engine 136. The delivery time information generator 300 performs the delivery time information generating methods disclosed herein, such as receiving a request for web content associated with a product sold online, and extracting delivery schedule information relating to the product. The delivery time information generator 300 may be implemented by one or more general-purpose processors that execute instructions stored in a memory (e.g. in memory 204) or stored in another computer-readable medium. The instructions, when executed, may cause the delivery time information generator 300 to perform the operations of the delivery time information generator 300, e.g., operations relating to the generation of delivery time information to be displayed in association with a product sold in a merchant's online store 138. Alternatively, some or all of the delivery time information generator 300 may be located inside the e-commerce platform 100 but external to, and coupled to, the commerce management engine 136. In some embodiments, the delivery time information generator 300 may instead be located externally to the e-commerce platform 100 and possibly coupled to the commerce management engine 136.

Although the delivery time information generator 300 in FIG. 3 is illustrated as a distinct component of the e-commerce platform 100 in commerce management engine 136, this is only an example. The delivery time information generator 300 could also or instead be provided by another component residing within or external to the e-commerce platform 100. In some embodiments, either or both of the applications 142A-B may provide a delivery time information generator 300 that implements the functionality described herein. The location of the delivery time information generator 300 is implementation specific. In some implementations, the delivery time information generator 300 is provided at least in part by an e-commerce platform, either as a core function of the e-commerce platform or as an application or service supported by or communicating with the e-commerce platform. In some embodiments, at least a portion of the delivery time information generator 300 may be implemented in a user device (e.g. merchant device 102 and/or customer device 150). For example, the customer device 150 might store and run at least some of the delivery time information generator 300 locally as a software application.

Although the embodiments described herein may be implemented using the delivery time information generator 300 in e-commerce platform 100, the embodiments are not limited to the specific e-commerce platform 100 of FIGS. 1 to 3 and could be used in connection with any e-commerce platform. Also, the embodiments described herein need not necessarily be implemented in association with an e-commerce platform, although e-commerce platform, as used herein, has a broad meaning and includes online marketplaces and standalone online stores. To encompass all possibilities, the embodiments below will be described more generally.

Example System for Generating Delivery Time Information

Figure 4:
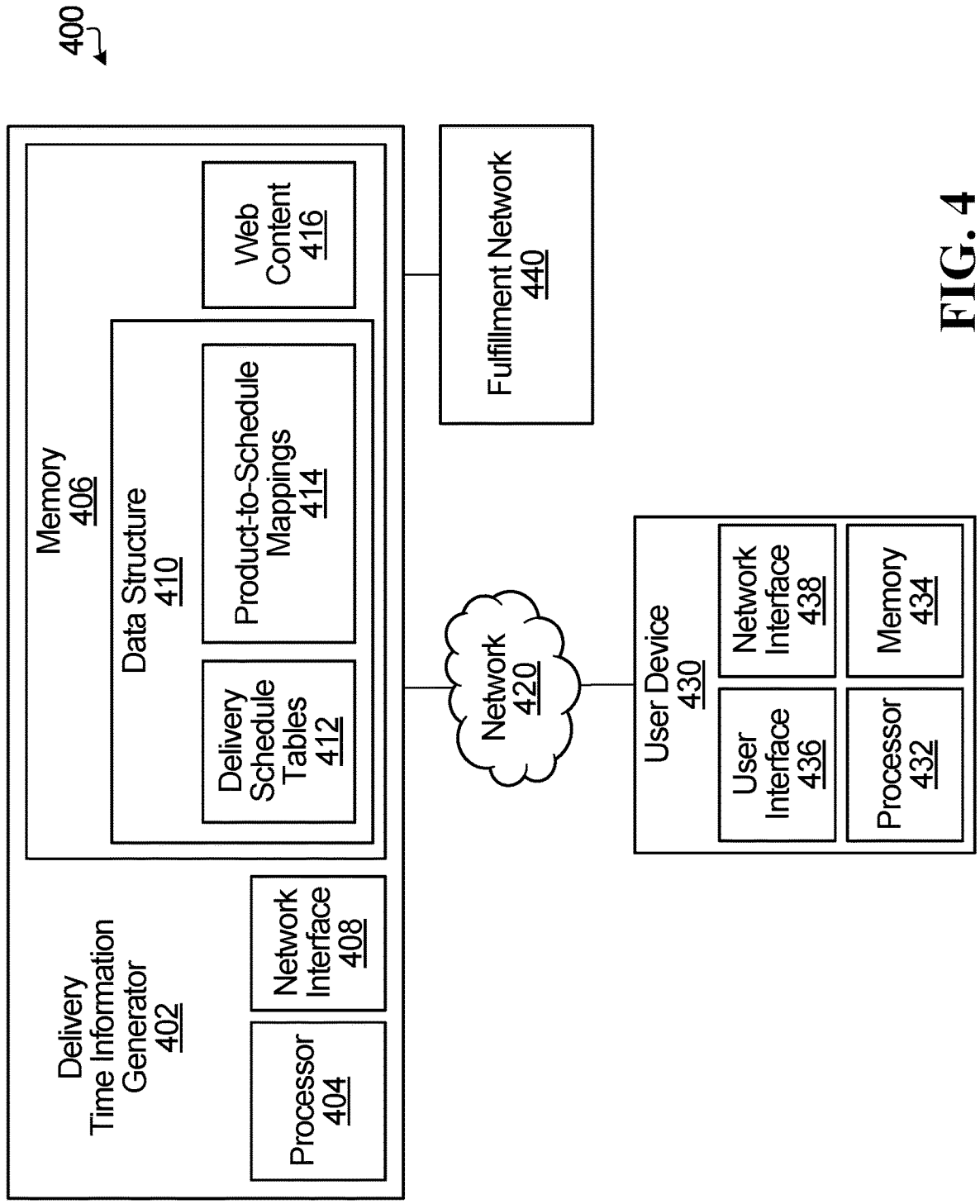
FIG. 4 is a block diagram illustrating an example system for generating information relating to the delivery time of a product sold online, according to some embodiments.

FIG. 4 is a block diagram illustrating an example system 400 for generating delivery time information associated with a product sold by a merchant, according to some embodiments. The system 400 includes a delivery time information generator 402, a network 420, a user device 430, and a fulfillment network 440.

The delivery time information generator 402 may be part of an e-commerce platform, such as e-commerce platform 100. As illustrated, the delivery time information generator 402 includes a processor 404, memory 406, and a network interface 408.

The processor 404 directly performs, or instructs the delivery time information generator 402 to perform, the operations described herein as being performed by the delivery time information generator 402, such as extracting delivery schedule information for a product or providing content for display on a user interface of a user device such as user device 430. The processor 404 may be implemented by one or more general purpose processors that execute instructions stored in a memory (e.g. in memory 406) or stored in another computer-readable medium. The instructions, when executed, cause the processor 404 to directly perform, or instruct the delivery time information generator 402 to perform the operations described herein. Alternatively, the processor 404 may be implemented using dedicated circuitry, such as a programmed FPGA, a GPU, or an ASIC.

The memory 406 may store instructions and data used or generated by the delivery time information generator 402. For example, the memory 406 may store software instructions or modules configured to implement some or all of the functionality and/or embodiments described herein and that are executed by the processor 404. The memory 406 may include a delivery data structure 410, which includes delivery schedule tables 412 and product-to-schedule mappings 414, as described herein. As well, the memory 406 includes web content 416, which may be transmitted over the network 420 for display on a user device. A single memory 414 is shown in FIG. 4, but in implementation the memory 406 may be distributed. Web content 416 may include web content transmitted to a user device, such as an online store product page or an online checkout page. Content from web content 416 may be dynamically modified by delivery time information generator 402, based on data stored in data structure 410, before being transmitted over network 420 for display on user device 430.

The network interface 408 is provided for communicating over a network, e.g. to communicate with user device 430. The network interface 408 may be implemented as a network interface card (NIC), and/or a computer port (e.g. a physical outlet to which a plug or cable connects), and/or a network socket, etc., depending upon the implementation.

In some embodiments, the processor 404, memory 406, and/or network interface 408 may be located outside of the delivery time information generator 402.

The network 420 may be a computer network implementing wired and/or wireless connections between different devices, including the delivery time information generator 402 and the user device 430. The network 420 may implement any communication protocol known in the art. Non-limiting examples of network 420 include a local area network (LAN), a wireless LAN, an internet protocol (IP) network, and a cellular network.

The user device 430 includes a processor 432, a memory 434, a user interface 436, and a network interface 438. Although only one user device 430 is illustrated in FIG. 4 for ease of explanation, a plurality of user devices may communicate with the delivery time information generator 402 over network 420.

The processor 432 of user device 430 directly performs or instructs all of the operations performed by the user device 430. Examples of these operations include sending a request for web content relating to a product to the delivery time information generator 402, and receiving a reply which includes the requested web content including delivery time information relating to the product, which is then displayed via the user interface 436 of user device 430. The processor 432 may be implemented by one or more processors that execute instructions stored in the memory 434 or in another computer readable medium. Alternatively, some or all of the processor 432 may be implemented using dedicated circuitry, such as an ASIC, a GPU, or a programmed FPGA.

The network interface 438 is provided for communicating over the network 420. The structure of the network interface 438 will depend on how user device 430 interfaces with the network 420. For example, if user device 430 is a wireless device such as a mobile phone, headset or tablet, then the network interface 438 may include a transmitter/receiver with an antenna to send and receive wireless transmissions to/from the network 420. If the user device is a personal computer connected to the network with a network cable, then the network interface 438 may include, for example, a NIC, a computer port, and/or a network socket. The user interface 436 may be implemented as a display screen (which may be a touch screen), and/or a keyboard, and/or a mouse, etc., depending upon the implementation.

The fulfillment network 440 may communicate with delivery time information generator 402 as described herein. The fulfillment network 440 may send to the delivery time information generator 402, at least a part of the data to be stored in delivery data structure 410 of memory 406. For example, fulfillment network 440 may send delivery schedule tables to be stored in delivery schedule tables 412 of memory 406, and/or product-to-schedule mappings to be stored in product-to-schedule mappings 414 of memory 406. Alternatively or additionally, fulfillment network 440 may send data associated with delivery time of a product sold online, which is processed and/or altered by the delivery time information generator 402 before it is stored in delivery schedule tables 412 and/or product-to-schedule mappings 414. Fulfillment network 440 may communicate with delivery time information generator 402 through the network 420, although this is not necessary. Although only one fulfillment network 440 is illustrated in FIG. 4 for ease of explanation, delivery time information generator 402 may communicate with a plurality of fulfillment networks. Fulfillment network 710 shown in FIG. 7 (described later) is one example of fulfillment network 440.

In some embodiments, at least a portion of the data structure 410 may be stored on a shared database between the fulfillment network 440 and the delivery time information generator 402, as opposed to being sent by the fulfillment network and subsequently received and stored in memory 406 of delivery time information generator 402. For example, the set of delivery schedule tables and/or the product-to-schedule mapping for a fulfillment network, such as a 3PL, may be stored on a shared database which delivery time information generator 402 can access (e.g., by read-only access) and the 3PL can modify with updated information.

Figure 5:
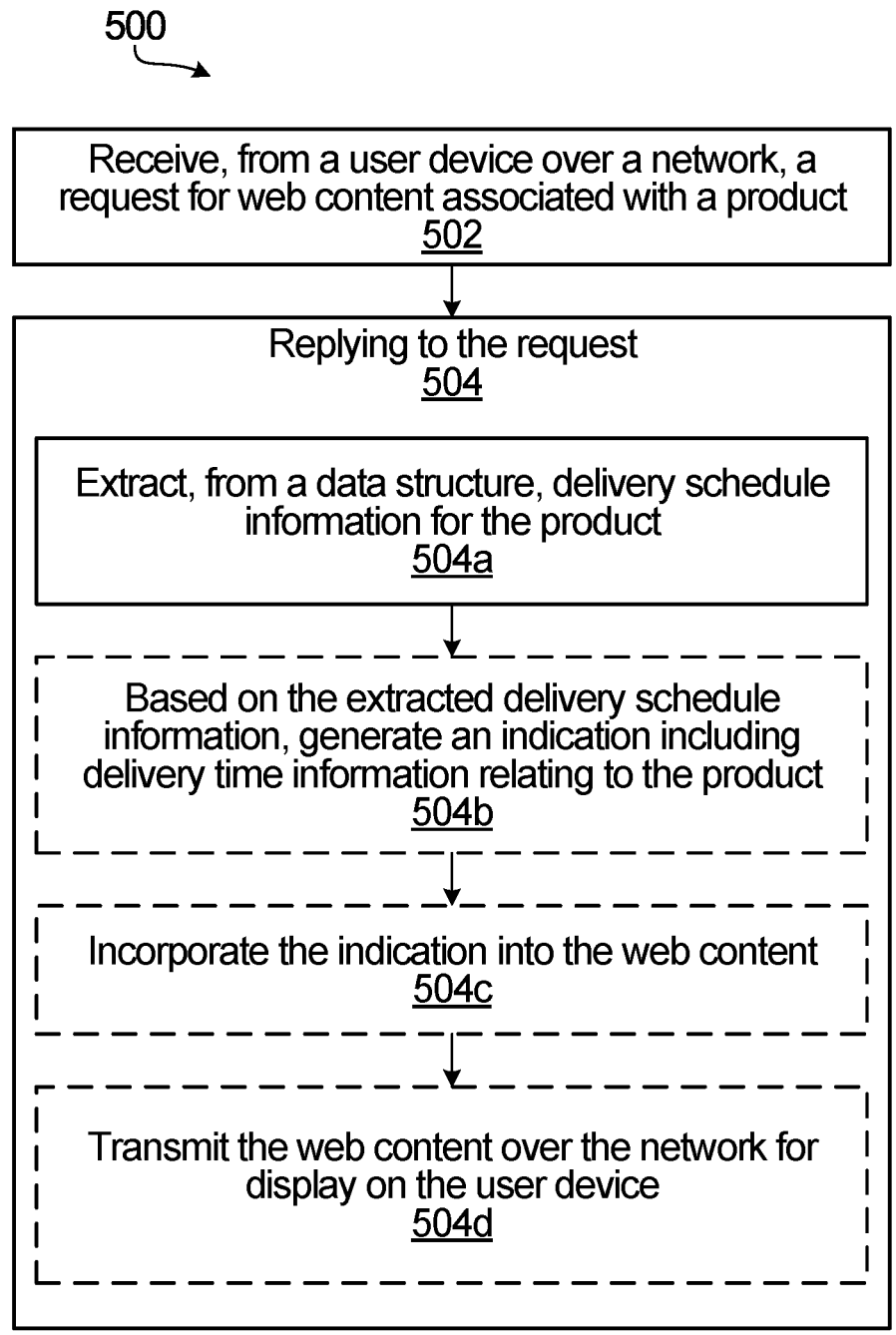
FIG. 5 illustrates a computer-implemented method, according to some embodiments.

FIG. 5 illustrates a computer-implemented method 500, according to some embodiments. The steps of method 500 are described as being performed by the processor 404 of delivery time information generator 402 of FIG. 4, but this is only an example. At least a portion or all of the method 500 may instead be performed elsewhere, such as at another processor separate from the delivery time information generator 402, or at the user device 430.

Figure 11:
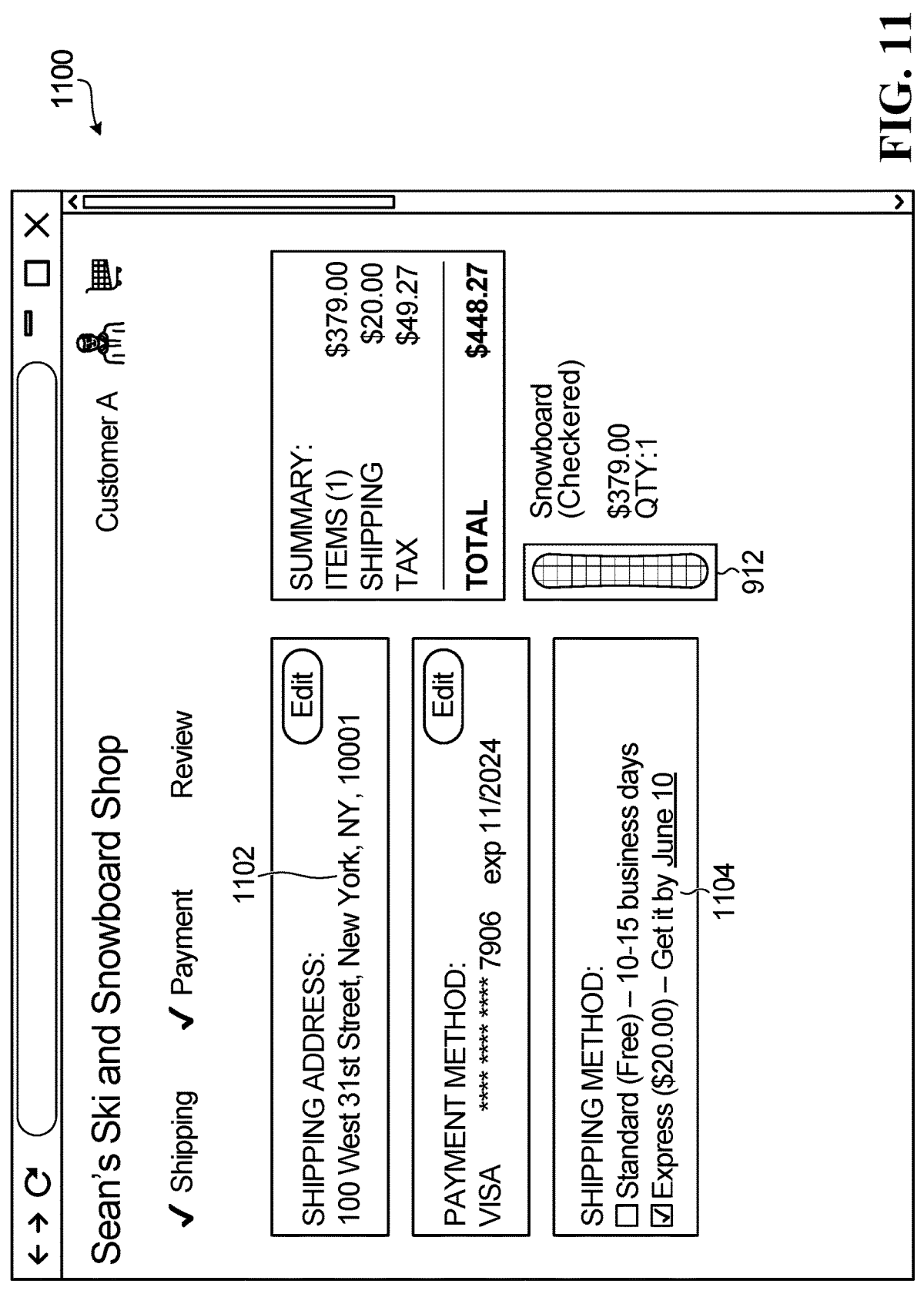

At step 502, processor 404 may receive, from a user device over a network, a request for web content associated with one of a plurality of products sold on an e-commerce platform. The user device may be user device 430, which may communicate with delivery time information generator 402 via network 420, and may request web content stored in web content 416 of delivery time information generator 402. For example, a user of user device 430 may request web content (e.g. using a HTTP or HTTPS request) such as a product details page or a checkout page associated with a product sold on an online store. FIG. 11 illustrates an embodiment in which a user has requested, for example using user interface 436 of user device 430, a checkout summary page 1100 for a product 912 which the user wishes to purchase. The requested web content, such as a product details page, may be stored in web content 416 of memory 406. The request may be sent through network interface 438 of user device 430 and received at network interface 408 of delivery time information generator 402. Checkout summary page 1100 may include a delivery/shipping address 1102 to which the product 912 should be delivered after purchase, and a message 1104 displaying delivery time information associated with the product 912.

Figure 6:
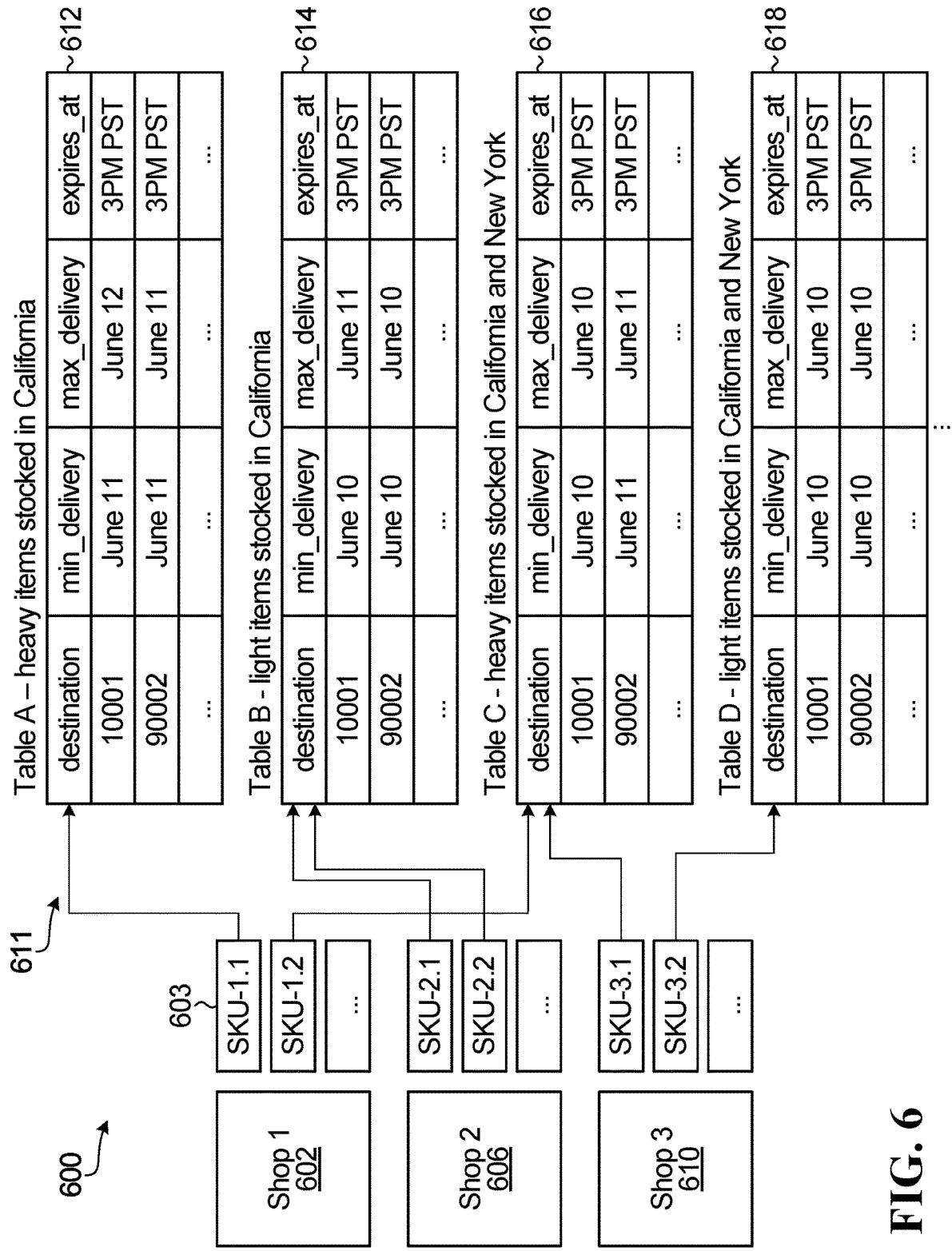
FIG. 6 illustrates an example diagram of product-to-schedule mappings associated with products sold online, and a set of delivery schedule tables, according to some embodiments.

Returning to FIG. 5, at step 504, processor 404 may reply to the request for web content by the user device. The replying step 504 may include a step 504a of extracting, from a data structure, delivery schedule information for the product. The request for web content may include information that may be used by processor 404 to extract delivery schedule information from the data structure relating to the product. The data structure may include a plurality of delivery schedule tables as well as a mapping of each of the plurality of products sold on the e-commerce platform to a respective one of the plurality of delivery schedule tables. The data structure may be data structure 410 of delivery time information generator 402, and the plurality of delivery schedule tables and the mappings may be stored within delivery schedule tables 412 and product-to-schedule mappings 414, of data structure 410, respectively. For example, FIG. 6 shows a plurality of delivery schedule tables 612, 614, 616, 618, and a set of mappings 611. The mappings 611 map each of a plurality of products, labelled based on a stock keeping unit (SKU) number, to a respective one of the plurality of delivery schedule tables 612, 614, 616, 618. Using the mappings 611 and the delivery schedule tables, processor 404 may extract delivery schedule information for any of the plurality of products. For example, for a product 603, processor 404 may use mappings 611 to determine that delivery schedule table 612 must be consulted to extract the respective delivery schedule information.

Each of the plurality of delivery schedule tables may be based on a respective different set of one or more categories to which multiple ones of the plurality of products map. For example, in FIG. 6 the delivery schedule tables 612, 614, 616, 618 are based on categories of weight and fulfillment center or warehouse location. For instance, delivery schedule table 612 contains delivery schedule information for relatively heavy items which are stocked at a California location, while delivery schedule table 614 contains delivery schedule information for relatively light items which are stocked at a California location.

Returning to FIG. 5, the replying step 504 may further include a step 504b of generating an indication including delivery time information relating to the one product based on the delivery schedule information extracted from the data structure. The indication may be or include a message. For example, based on the extracted delivery schedule information for the product 603 in FIG. 6, processor 404 may generate an indication, the indication that the product 603 may be delivered to a user having an address with a 90002 zip code by June 11. As another example, based on extracted delivery schedule information for the product 912 in FIGS. 9-11, processor 404 may generate an indication that the product 912 may be delivered to a user having a 10001 zip code by June 10, as shown by message 1104 in FIG. 11.

The replying step 504 may further include a step 504c of incorporating the indication into the web content. Processor 404 may dynamically modify the requested web content, such as the checkout summary page 1100 of FIG. 11, to incorporate the indication including delivery time information related to the product. The replying step 504 may further include a step 504*d* of transmitting the web content over the network for display on the user device. This may include the processor 404 of the delivery time information generator 402 instructing transmission of the requested web content having the indication by instructing network interface 408 to send the web content to the user device 430 (e.g. as a response to an HTTP or HTTPS request for the content). For example, the summary checkout page 1100 may be transmitted to user device 430 and presented to the user via the user interface 436 of the user device, as shown in FIG. 11. The summary checkout page 1100 may include the indication as the message 1104 which recites, "Get it by June 10."

The replying step 504 described above, including all of steps 504*a-d*, may occur within a timing constraint associated with providing web content during a user's real-time online interaction with an e-commerce platform, such as e-commerce platform 100. For example, the replying step 504 may occur under two seconds, and may more likely occur under half of a second.

FIG. 6 is an example diagram including product-to-schedule mappings and a set of delivery schedule tables associated with products sold online, according to some embodiments.

FIG. 6 shows three online shops 602, 606, 610 which may be hosted by a computer of an e-commerce platform. Each shop may sell a plurality of items, and each of the items may be or map to an SKU. For example, product 603 sold by shop 602 may be or map to an SKU labelled "SKU-1.1" in FIG. 6. All of the items sold by the three online shops 602, 606, 610 may be managed by one fulfillment network, for example fulfillment network 440 of FIG. 4 or fulfillment network 710 of FIG. 7.

FIG. 6 also shows product-to-schedule mappings 611, which are illustrated by arrows, and a set of delivery schedule tables which include delivery schedule tables 612, 614, 616, and 618. The mappings 611 and delivery schedule tables 612, 614, 616, 618 may form part of a data structure, such as data structure 410 of memory 406, and may be used by the delivery time information generator 402 to extract delivery schedule information for any of the plurality of products sold by the shops 602, 606, and 610. For example, mappings 611 may be stored in product-to-schedule mappings 414 and the delivery schedule tables 612, 614, 616, 618 may be stored in delivery schedule tables 412 of data structure 410.

Each individual mapping in the product-to-schedule mappings 611 may map one product sold by one of shops 602, 606 or 610, to a respective delivery schedule table, such as delivery schedule tables 612, 614, 616, 618, such that all of the products sold by shops 602, 606, 610 is mapped to a delivery schedule table. For example, for the product 603, FIG. 6 shows a product-to-schedule mapping which maps the product 603 to delivery schedule table 612. Accordingly, product 603 may be a relatively heavy item which is currently stocked at a California warehouse location of fulfillment network 440.

Each of the delivery schedule tables may contain delivery schedule information for different delivery destinations. The different delivery destinations may represent all of the possible destinations to which a respective product may be delivered within a certain region. In FIG. 6 for example, each of the delivery schedule tables 612, 614, 616, 618 may contain delivery schedule information for different zip code areas in the United States. The different delivery destinations may be recorded as individual addresses, or alternatively may be divided into larger blocks, such as zip code areas or regions. Organizing the different delivery destinations by zip code area as shown in FIG. 6, as opposed to individual addresses, may be beneficial as zip code areas remain largely unchanged, while organizing by individual address may require for the delivery schedule tables to be updated frequently, e.g., whenever a new address is created. The different delivery destinations may be alternatively or additionally categorized into different types, e.g. a P.O. box address type, a residential address type, or a commercial address type. Categorizing by address type may increase the accuracy of computed delivery time information.

For each of the delivery destinations, each of the delivery schedule tables 612, 614, 616, 618 may include an earliest delivery date and a latest delivery date, the earliest and latest delivery dates representing the earliest and latest date which the product may be delivered to a user living at the respective delivery destination, barring unforeseen circumstances. The earliest delivery date and the latest delivery date may be the same date, or may be different dates.

Each of the delivery schedule tables, including delivery schedule tables 612, 614, 616, 618, may have an expiry time, after which time the information contained with the delivery schedule table (e.g., the earliest and latest delivery dates) may not be accurate. For example, the delivery schedule tables 612, 614, 616, 618 in FIG. 6 have an expiry time of 3 PM PST. Therefore, in some embodiments, delivery schedule tables 412 of memory 406 may store a plurality of versions for each table. For example, for each delivery schedule table, the delivery time information generator 402 may receive and store in memory 406 a first delivery schedule table version (a "current" delivery schedule table) which expires some time (e.g., 3 PM PST) during the current day, and a second delivery schedule table version (a "future" delivery schedule table) which expires at some time during the next day. At a defined time, e.g., at the start of a new day, or at the expiry point of the "current" delivery schedule table, or at a point in time prior to such events, the delivery time information generator 402 may receive and store in memory 406 a delivery schedule table version for the day subsequent to the day in which the "future" delivery schedule table expires. Upon expiry, the "current" delivery schedule table may be deleted from the computer's memory. At this point, the "future" delivery schedule table becomes the "current" delivery schedule, while the most recently received delivery schedule table version becomes the "future" delivery schedule. This process may be repeated such that delivery time information generator 402 may always have quick access to accurate and reliable delivery schedule information for an item purchased even just past the expiry time of a delivery schedule table.

Each of the delivery schedule tables 612, 614, 616, 618 may be based on a respective different set of one or more categories to which multiple ones of the plurality of products map. For example, it can be seen in FIG. 6 that the delivery schedule tables 612, 614, 616, 618 are based on weight, i.e., whether an item is "light" or "heavy", and available fulfillment center locations, i.e., whether an item is stocked in California, New York, or both (the tables showing delivery schedules for an item stocked only in New York are omitted for simplicity). In the example depicted in FIG. 6, there may be six categories: "light items", "heavy items", "stocked in California", "stocked in New York" and "stocked in California and New York". Delivery schedule table 612 may be based on the different set of categories {"heavy items", "stocked in California"}; delivery schedule table 614 may be based on the different set of categories {"light items", "stocked in California"}; delivery schedule table 616 may be based on the different set of categories {"heavy items", "stocked in California and New York"}; and delivery schedule table 618 may be based on the different set of categories {"light items", "stocked in California and New York"}. Delivery schedule tables 612, 614, 616, 618 may be lookup tables as shown in FIG. 6, but this is not necessary.

The categories upon which the delivery schedule tables of FIG. 6 are based are just an example of the types of categories. Examples of types of categories may include: categories based on product characteristics, such as product dimension and product "type" (e.g., bulky, dangerous, etc.); categories based on location (e.g. which set of warehouses have the product in stock), and/or permutations or combinations thereof.

In some embodiments, the product-to-schedule mappings may be factored or decomposed into two or more component mappings, such as, e.g., a product-to-weight-class mapping and a weight-class-to-schedule mapping. The factorization or decomposition may be selected so that the resultant component mappings can be updated at different frequencies, and/or because they must be updated at different frequencies. For example, the product-to-weight-class mapping may need to be more frequently updated (e.g. to add new products) than the weight-class-to-schedule mapping. The factorization or decomposition may additionally or alternatively, take latency into account so that, for example, mappings that take longer to update are separated from mappings that are quicker to update.

Although not immediately evident from the illustration of FIG. 6, the total number of the delivery schedule tables may be less than the total number of the number of products sold by shops 602, 606, 610. Generally speaking, the total number of the delivery schedule tables (and thus number of mappings) may be less than the total number of the number of products for which the delivery schedule tables (and mappings) are generated. In some embodiments, the total number of the delivery schedule tables may be multiple orders of magnitude less than the total number of products for which the delivery schedule tables are generated. For example, in some embodiments, the number of delivery schedule tables may reach into the tens or hundreds, while the number of products sold on an e-commerce platform may reach into the millions. Therefore, in a solution where the e-commerce platform requests, for each product sold on the platform, a fulfillment network to precompute delivery schedule information for each possible delivery destination, it is evident why it poses storage, efficiency, and delay concerns. In comparison, the generation and transmission of the delivery schedule tables and mappings as described herein may be much more storage-friendly, efficient, and quick.

Figure 7:
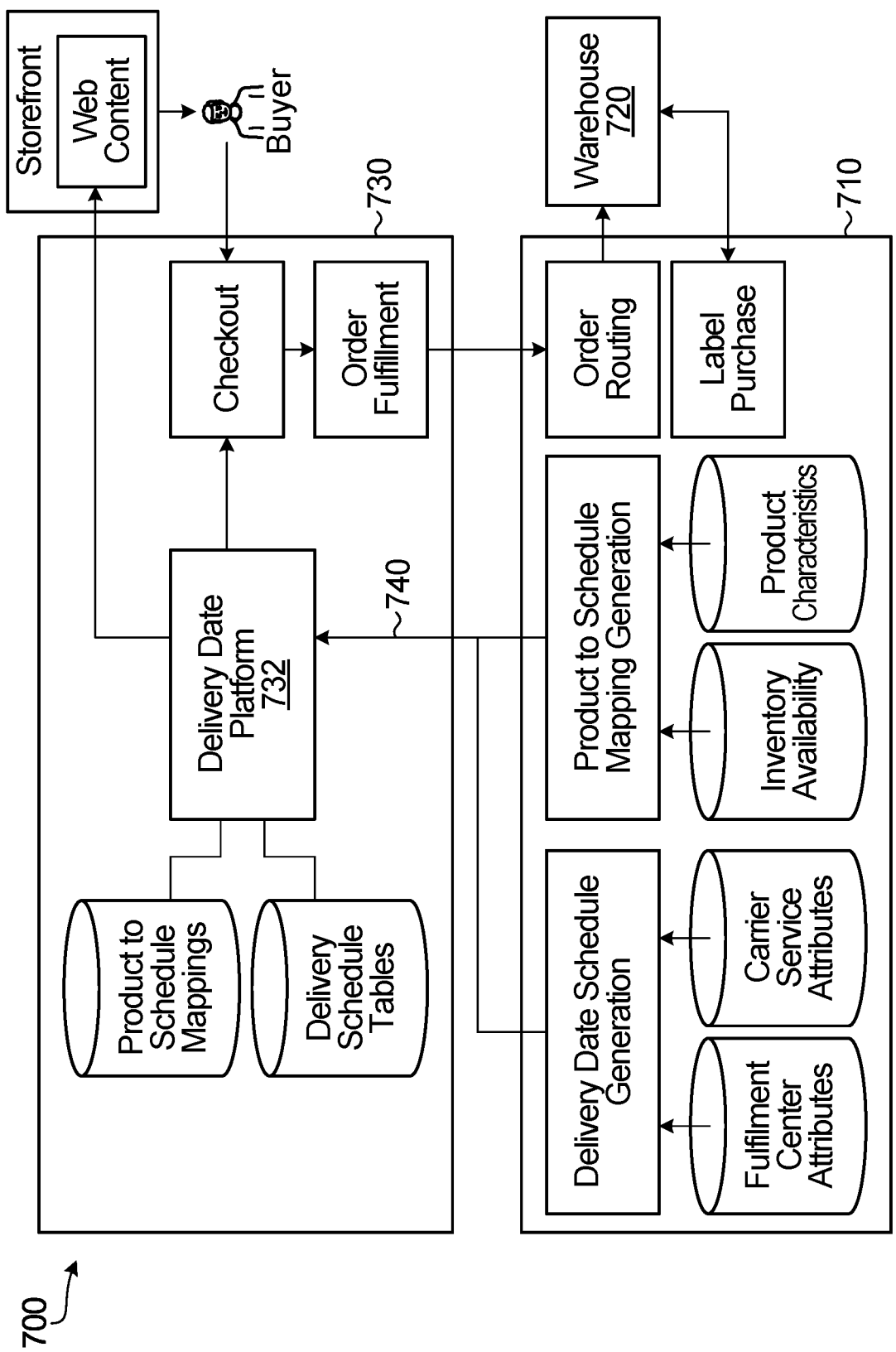
FIG. 7 illustrates an example system overview for generating information relating to the delivery time of a product sold online, according to some embodiments.

FIG. 7 illustrates an example system overview 700 for generating information relating to the delivery time of a product sold online, according to some embodiments. The system overview 700 includes an e-commerce platform 730 and a fulfillment network 710.

E-commerce platform 730 may be or may be included in e-commerce platform 100 of FIGS. 1-3. As shown, e-commerce platform 730 may include product-to-schedule mappings (which may be or may be included in product-to-schedule mappings 414), delivery schedule tables (which may be or may be included in delivery schedule tables 412), and a delivery date platform 732 which may be or may include delivery time information generator 402. E-commerce platform 730 communicates with a buyer (which may be a user or a user device such as user device 430) and with fulfillment network 710.

Fulfillment network 710 may be a fulfillment service integrated with e-commerce platform 730, or may be provided by one or more third-party logistics providers (3PLs). Fulfillment network 710 may be or may be included in fulfillment network 440 of FIG. 4. Fulfillment network 710 may be responsible for generating delivery date schedules (which may be delivery schedule tables, such as delivery schedule tables 612, 614, 616, 618) and product-to-schedule mappings (which may be mappings, such as mappings 611) to be sent to the e-commerce platform 730. Fulfillment network 710 may communicate with a fulfillment center, illustrated in FIG. 7 as warehouse 720. Although only one warehouse 720 is shown for ease of explanation, fulfillment network 710 may communicate with a plurality of warehouses.

As shown, the fulfillment network 710 may generate delivery date schedules based on various factors, such as fulfillment center attributes and carrier service attributes. Example carrier service attributes include operating days, processing time, and capacity. For example, a statutory holiday or warehouse closures may affect the earliest and latest delivery dates for some products managed by fulfillment network 710. Example fulfillment center attributes include pickup times, capacity, transit days, delivery days, time in transit, cost, type (e.g., air, ground), product characteristic categories, and fulfillment center (or warehouse) locations. Example product characteristic categories include weight classes of a product, dimension classes of a product, and "type" of product (e.g., dangerous, fragile, etc.). For example, weight classes may be "light" or "heavy", or may be further specified or broken down, such as into a first weight class for items under 1 pound, a second weight class for items between 1-4 pounds, a third weight class for items between 4-9 pounds, and a fourth weight class for items heavier than 9 pounds. These weight classes may be determined based on an analysis of items that are commonly stored for delivery at the fulfillment network 710.

The product characteristic categories and fulfillment center locations may affect how delivery schedule tables are created, and how many are created. For example, in FIG. 6, since the product weight classes were either "light" or "heavy", and assuming that the items sold from shops 602, 606, 610 were stocked only at one or both of California and New York fulfillment center locations, there may be six delivery schedule tables in total. If instead the weight classes were further divided (such as into the four classes mentioned previously), and/or there were more fulfillment center locations (e.g. a fulfillment center in Washington), there may be more delivery schedule tables, e.g.: one for items weighing less than 1 pound and stocked only at the New York location, another for items weighing between 1 and 4 pounds and stocked only at the New York location, another for items weighing between 4 and 9 pounds and stocked only at the New York location, and so on. Thus, depending on the number of product characteristic categories, and the number of different fulfillment center locations, the number of generated delivery schedule tables may increase or decrease.

In some embodiments where the delivery schedule tables are based on categories which include fulfillment center locations, as the number of fulfillment centers grow, the number of delivery schedule tables and thus the data structure which stores the delivery schedule tables (e.g., data structure 410) may be additionally optimized by grouping the fulfillment centers into regions rather than viewing them as isolated singular centers.

The fulfillment network 710 may generate product-to-schedule mappings based on various factors such as inventory availability data and product characteristic categories. For each product, the respective product-to-schedule mapping (i.e., the delivery schedule table to which the product is mapped) may depend on the product characteristic categories under which the product falls, and inventory availability data, i.e., which warehouse or fulfillment center location(s) have the product in stock. For example, alluding to FIG. 6, if the product characteristic categories were weight categories of "light" and "heavy", and the possible warehouse locations for stocking products were in California and New York, for an item that falls into the "light" category and is currently stocked at both California and New York locations, the fulfillment network 710 would generate a mapping for that product such that it maps to delivery schedule table 618.

Once fulfillment network 710 generates the delivery date schedules and the product to schedule mappings, the fulfillment network may send them to e-commerce platform 730, as illustrated by arrow 740. The generated delivery date schedules may be stored in delivery schedule tables of the e-commerce platform 730, and the generated product to schedule mappings may be stored in product to schedule mappings of the e-commerce platform 730. The delivery schedule tables and product to schedule mappings may then be used by delivery date platform 732 (which may be or may include delivery time information generator 402) to obtain delivery schedule information for any product sold on the e-commerce platform 730 and managed by fulfillment network 710.

In order to obtain such delivery schedule information and provide delivery time information for display on user device 430, delivery date platform 732 does not require additional data from the fulfillment network aside from the product-to-schedule mapping and the delivery schedule tables. In other words, delivery date platform 732 need not know of the categories and other considerations used by the one or more fulfillment network 710 to generate the delivery schedule tables. Thus, regardless of the factors and constraints that different fulfillment networks use to compute delivery time information, the e-commerce system may be compatible with any fulfillment network as long as the product-to-schedule mapping and delivery schedule tables are sent by the fulfillment network. In the context of FIG. 6, for example, the delivery time information generator 402 need not know that product 603 is considered to be a heavy item and is currently stocked at a California fulfillment center location, nor need it know that table 612 is based on heavy items which are stocked at a California fulfillment center. Instead, delivery time information generator 402 may only be aware that product 603 maps to table 612 (via mappings 611), and that by consulting table 612, delivery time information generator 402 can extract delivery schedule information for product 603 for a user residing at any destination location listed within table 612. Not only does this allow for compatibility with different fulfillment networks, but it also allows for each fulfillment network to maintain as private the different factors and constraints used by that fulfillment network to generate its delivery schedule tables and product-to-schedule mapping.

Certain changes, such as changes in inventory availability data or product characteristic categories, may result in a change of the product-to-schedule mapping for one or more products managed by fulfillment network 710. Certain other changes, such as the addition of a new product, may result in a new product-to-schedule mapping. For example, the addition of a new product onto e-commerce platform 730 which is to be managed by fulfillment network 710, may result in a new mapping once fulfillment network 710 has stocked inventory of the new product and could provide reliable delivery information. In some embodiments, warehouse 720 may send updates to fulfillment network 710, the updates including information on product inventory or warehouse changes. Examples of such changes include the inventory of a product managed by the fulfillment network 710 at a particular warehouse location running out or dropping below a particular threshold, a product being newly stocked at an additional warehouse location, a new product being stocked at one or more warehouse locations, a warehouse shutting down permanently or temporarily due to severe weather events, etc. This may then result in a changed mapping for the product. For example, in FIG. 6, if product 603 became stocked in New York in addition to California, mappings 611 may be updated such that product 603 is mapped to delivery schedule table 616 instead of 612. If the New York warehouse then had to suddenly shut down due to bad weather, or the inventory of product 603 dropped to zero or below a threshold level at the New York warehouse, mappings 611 may be updated again such that product 603 is mapped again to delivery schedule 612. Any changes which affect the mapping of one or more products may be communicated as soon as possible by the fulfillment network 710 to the e-commerce platform 730, such that the delivery time information generator 402 may generate and transmit accurate delivery schedule information in replying to a request for web content by a user device.

In some embodiments, the delivery schedule tables may need to be frequently updated, for example as the expiry deadline for a delivery promise is passed, and/or to account for factors such as carrier pickup schedules, holidays, etc. The tables may only be updated at certain times and/or on certain days of the week. In comparison, the product-to-schedule mappings may need to be updated less frequently, such as upon the occurrence of an event as described above, which alters the mapping for one or more products, or results in a new mapping.

In some embodiments, delivery date platform 732 may request one or more updated delivery schedule tables on demand, for example, if a delivery schedule table, or a portion of a delivery schedule table, has expired and there is no updated table. Alternatively, in such scenarios, delivery date platform 732 may use an expired delivery schedule table, however this may be avoided where possible.

In some embodiments, updating the delivery schedule tables generated by fulfillment network 710 may involve receiving from the fulfillment network 710, all of the delivery schedule tables populated with updated information. In some embodiments, updating the delivery schedule tables generated by fulfillment network 710 may involve receiving, from fulfillment network 710, only data that is different from the current delivery schedule tables, which may further reduce the amount of data needed to be transmitted between the fulfillment network and e-commerce platform 730. The same applies for the product-to-schedule mapping, i.e., in some embodiments when the product-to-schedule mapping changes, only the difference may be communicated to the computer, rather than a new copy of the mapping.

In some embodiments, the updates sent by warehouse 720 may be voluntary, i.e., initiated at the warehouse 720 side, for example in response to some trigger such as a drop in inventory below a threshold level. In some embodiments, queries may additionally or alternatively be made by fulfillment network 710 to warehouse 720. For example, the fulfillment network 710 may query or ping warehouse 720 for information associated with the product characteristics that are used to generate delivery schedule tables. Fulfillment network 710 may continue to query warehouse 720, for example to determine how the inventory stock level at a fulfillment center has changed, to generate updated product-to-schedule mapping.

Figure 8:
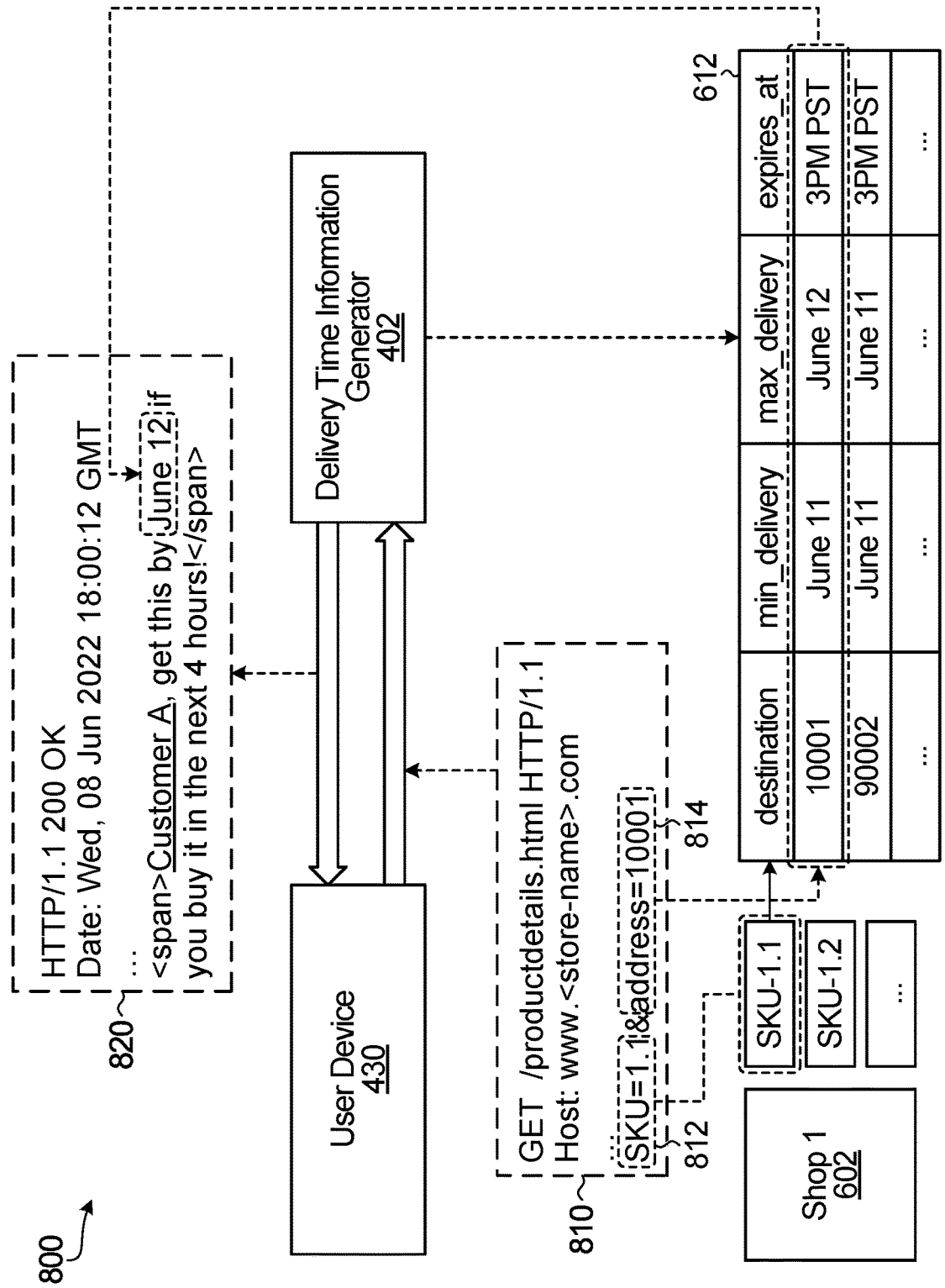
FIG. 8 illustrates an example flow for generating information relating to the delivery time of a product sold online, according to some embodiments.

FIG. 8 shows an example flow for generating information relating to the delivery time of a product sold online. A user of user device 430 may request for a product details page associated with a product sold online. As mentioned previously, to realize this, user device 430 may send a request for web content, the request being received by the delivery time information generator 402. The request is illustrated by the arrow pointing towards the delivery time information generator 402. The browser used by user device 430 to issue the URL may turn the URL into an HTTP or HTTPS request. For example, FIG. 8 shows an HTTP request 810. The HTTP request 810 may include information required for the delivery time generator 402 to load the requested web content. For example, in FIG. 8, the user may have wished to view a product details page for a product (such as product details page 1000 of FIG. 10), such that the URL of the web page recites "/productdetails . . . " or something similar in the HTTP request 810. The HTTP request 810 may also include information required for the delivery time information generator 402 to extract delivery schedule information for the product from data structure 410 of memory 406. For example, HTTP request 810 in FIG. 8 includes a product identifier component 812 and an address component 814. The product identifier component 812 may contain a unique identifier for the product, e.g., an SKU number, and the address component 814 may contain a delivery destination, e.g., a zip code.

Using the information contained in the product identifier component 812 and the address component 814, the delivery time information generator 402 may access the data structure 410 of memory 406 to extract the delivery schedule information for the product, generate an indication based on the extracted information, incorporate that indication into the requested web content, and transmit the web content over the network for display on user device 430. For example in FIG. 8, the product identifier component 812 may contain an SKU number which corresponds with product 603 sold by shop 602 shown in FIG. 6. Using the product identifier component 812 of the HTTP request 810, the delivery time information generator 402 may use the mappings 611 (which may be stored in the product-to-schedule mappings 414) to determine that for product 603, delivery schedule table 612 should be consulted for the delivery schedule information. The delivery time information generator 402 may then use the information contained in address component 814—in this case, zip code 10001—to look up and extract the respective delivery schedule information in delivery schedule table 612. As shown, the earliest guaranteed delivery date is June 11, and the latest guaranteed delivery date is June 12. Delivery time information generator 402 may generate an indication based on this extracted delivery schedule information, and incorporate this indication into the requested web content, as shown by a HTTP reply 820. HTTP reply 820 may be transmitted by delivery time information generator 402 and received at user device 430, as represented by the shaded arrow pointing towards the user device 430. The indication may be or may include the following text shown in the HTTP reply 820: " . . . get this by June 12 if you buy it in the next 4 hours!" June 12, i.e., the latest delivery date, may be chosen as the date to be included in the indication since the user would be guaranteed to have the product delivered by that date (barring unforeseen circumstances). The HTTP reply 820 may be received at network interface 438, and the requested web content having the indication may be displayed on user interface 436 of the user device 430. An example of the web content may be product details page 100 of FIG. 10.

Note that in the example in FIG. 8, instead of an explicit address component 814 in the HTTP request 810, the address component may be implicit, e.g. the IP address of the user device may be used to infer a geographic region or location, which may be mapped to a representative address (e.g. a ZIP code area). The representative address is assumed to be the shipping/delivery address. In such embodiments, an indication of the geographic region or location or representative address may also be incorporated into the web content to provide the user with context, e.g. "Get this by June 12 if you buy it in the next 4 hours (assuming shipping to an address in New York City)".

In FIG. 8 and other examples herein, the preparing and sending of the HTTP or HTTPS response, i.e. the replying, can occur within a timing constraint associated with providing the web content during a user's real-time online interaction with the e-commerce platform. This is because of the use of product-to-schedule mappings and delivery schedule tables, which allows for quick retrieval of the required data in a delivery schedule table using the information (such as delivery destination information and/or product identifier) in the HTTP or HTTPS request.

Examples of Web Content Will Now be Described in More Detail

Figure 9:
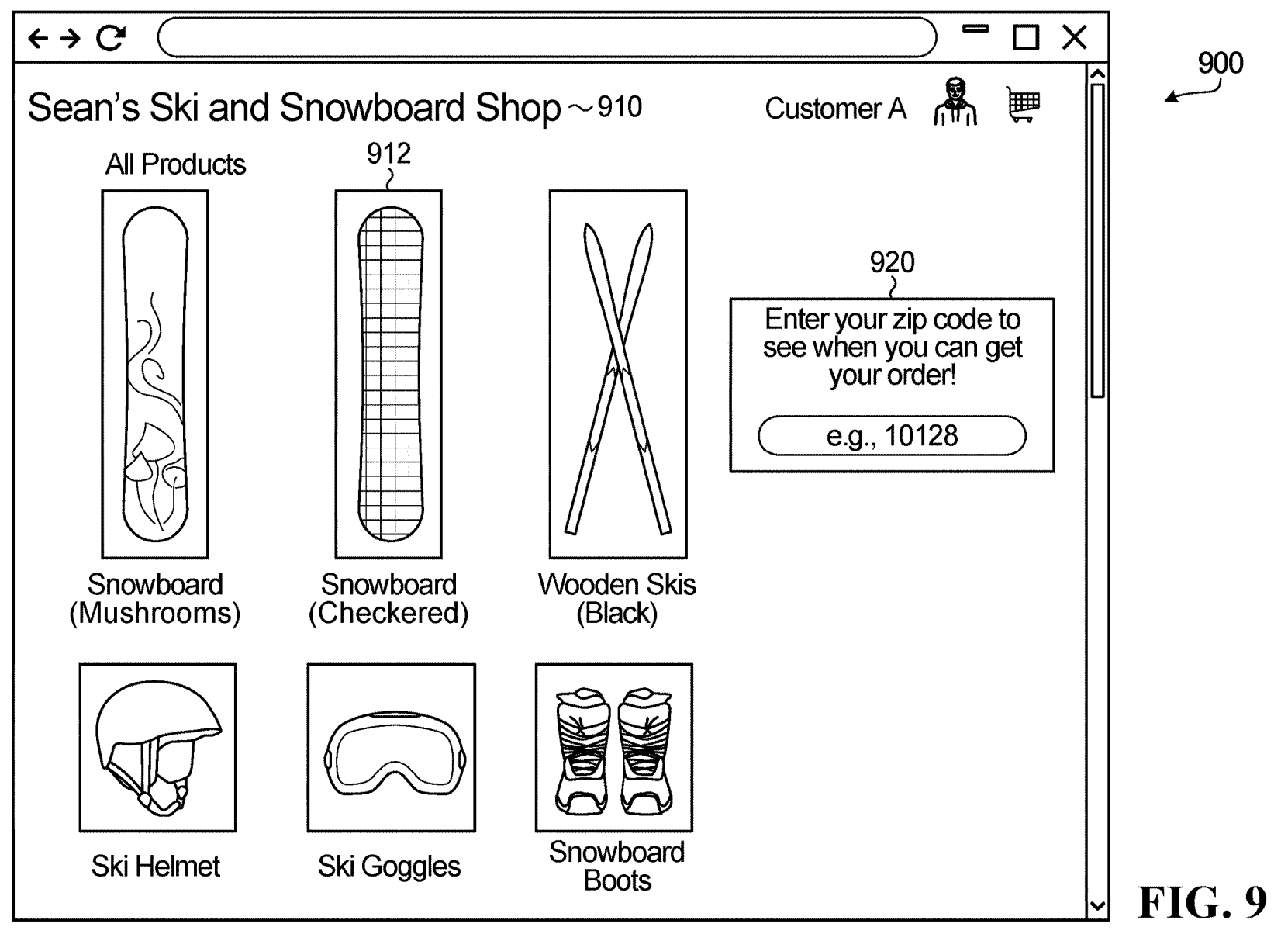

FIG. 9 shows a products page 900 which may be provided to a user via a user interface of a user device (such as user device 430), according to some embodiments. The products page 900 may display products being offered for sale online by a particular merchant owning an online shop 910. Online shop 910 may be hosted by an e-commerce platform, such as e-commerce platform 100 of FIGS. 1-3 or e-commerce platform 730 of FIG. 7.

The product page 900 may also display a widget 920, which may prompt a user to optionally enter in a delivery address or a more generalized delivery destination such as a city name, or zip code. Once the user does so, user device 430 may store the user's delivery destination in memory 434. User device 430 may then send the delivery destination as part of an HTTP request for web content associated with a product sold on online shop 910 of the e-commerce platform. Delivery time information generator 402 may use the delivery destination to extract delivery schedule information for the product.

Of the products offered for sale on online shop 910, the user may find a product 912 of interest, and may decide to view a product details page for the product 912, e.g., to view product specifications, cost, available colors, etc. To do so, the user may click on an icon or text for the product 912. Alternative ways (e.g., pressing, performing hand motion, verbally reciting instructions, etc.) may be possible to request the product details page, depending on the user device being used. The user may then be provided with a product details page, such as the one shown in FIG. 10.

Figure 10:
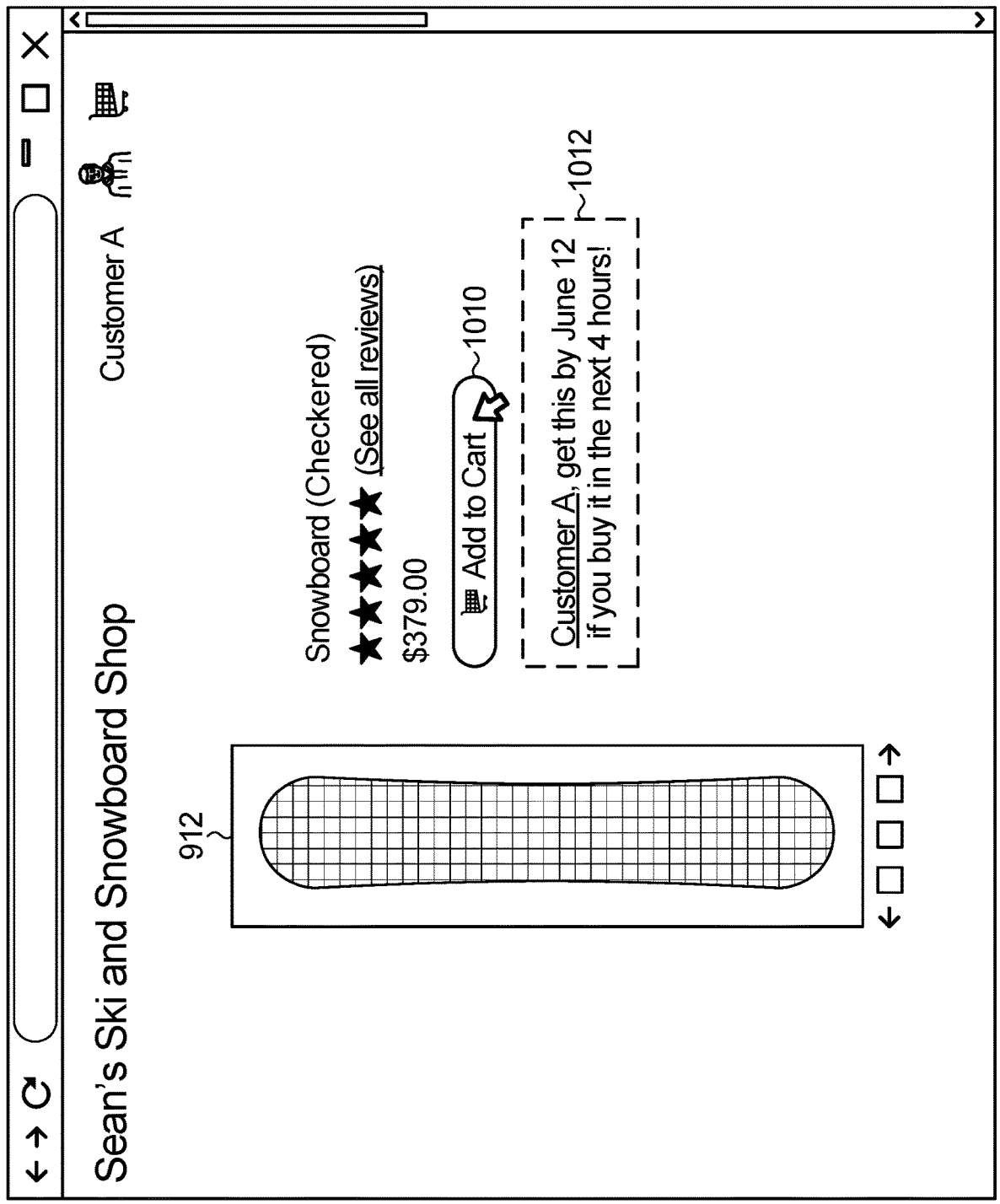

FIG. 10 shows a product details page 1000 for the product 912, the product details page 1000 displaying information relating to the delivery time of product 912 for a user, according to some embodiments. Product page 1000 may be provided to a user via a user interface of user device 430. In the embodiment shown in FIG. 10, the product details page 1000 displays a message 1012, which reads, "Customer A, get this by June 12 if you buy it in the next 4 hours!". To load the product details page 1000, user device 430 may send an HTTP request over the network 420. The HTTP request may contain a product identifier component and an address component. The product identifier component may include a unique identifier for the product 912, such as an SKU number. The address component may include the delivery destination that was entered by the user using widget 920 and stored by the user device 430. Using the product identifier component and the address component, delivery time information generator 402 may obtain delivery time information relating to product 912 for the user's delivery destination, using the processes as described herein. The delivery time information generator 402 may generate an indication including the delivery time information, dynamically modify product page 1000 to include the indication as message 1012, and transmit the product page 1000 for display on user device 430.

The product details page 1000 displaying information relating to the delivery time of product 912 is only an example of a web page incorporating delivery schedule information and is not intended to be limiting. In some embodiments, the delivery time information may appear based on an interaction with the product details page 1000 such as hovering a cursor over an "Add to cart" button 1010. In some embodiments, the delivery time information may be incorporated into the regular text matter on the product page 1300. In some embodiments, widget 920 may be displayed on product details page 1000 in addition to or instead of on products page 900. Upon a user inputting a delivery destination in widget 920, user device 430 may send an HTTP request to modify and reload at least a portion of product details page 1000 with delivery schedule information incorporated in the page.

In the embodiments described above in relation to FIGS. 9 and 10, a zip code entered by a user may be used by the delivery time information generator 402 to extract delivery schedule information, however this is only an example and is not meant to be limiting. There are various ways that a delivery destination of a user may be obtained. For example, in some embodiments, when a user is browsing a product page, user device 430 may or may not be instructed to perform geo-detection using the IP address of the user device. In some embodiments, a user may be logged in to an account associated with an online store or e-commerce platform. For instance, it can be seen in FIGS. 9-11 that the user is signed into an account with the online store 910 of e-commerce platform, and the online store 910 knows the user as "Customer A". The account might have saved information associated with the user, such as a default delivery address for the user. The request for a web page sent to the delivery time information generator 402 may include the saved default address, or it may already be stored in memory 406 of the delivery time information generator 402 for use by the delivery time information generator 402 in extracting delivery schedule information from data structure 410. In some embodiments, the delivery destination may not be known or may not be used by the delivery time information generator 402 to obtain delivery time information until the user is on a checkout page.

FIG. 11 shows a checkout summary page 1100 for a user who wishes to purchase the product 912. Checkout summary page 1100 may be a web page provided to a user as part of an online checkout process. In order to arrive at checkout summary page 1100, the user may have previously entered in a delivery address 1102 to which the product 912 should be delivered, e.g., at a "shipping" web page of the online checkout process, and then clicked on an icon or otherwise interacted with user device 430 to be provided with checkout summary page 1100. Alternatively, the user's address may already have been saved as part of an online account associated with the user. When user device 430 sends an HTTP request to load checkout summary page 1100, an address component of the request may include the delivery address 1102. Delivery time information generator 402 may use this address 1102, in addition to the unique product identifier for product 912 in order to obtain delivery time information relating to product 912 for the user's delivery destination, using the processes as described herein. The delivery time information generator 402 may then generate an indication including the delivery time information, dynamically modify checkout summary page 1100 to include the indication as message 1104, and transmit the checkout summary page 1100 for display on user device 430. The checkout summary page 1100 incorporating the delivery time information as message 1104 is only an example of a web page including delivery time information, and is not intended to be limiting. The display of delivery time information on a checkout page shown on a customer device can appear in any form.

In some embodiments, the delivery time information displayed on a web page, such as on product details page 1000, may be a preliminary delivery promise provided to a user before or during the purchase of the product from the online store. A secondary delivery promise may be provided to the customer following the purchase of the product, for example, in a purchase confirmation email. The secondary delivery promise may be a revised version of the preliminary promise based on the inclusion of new or updated information, such as weather or traffic reports.

Note that "web content", as used herein, includes any content retrieved by a device over the Internet, including content retrieved by a native app over the Internet, not just necessarily HTTP/HTTPS requests. Also, a "table" as used herein is not limited to a lookup table or a structure having rows and columns. A "table" refers to a partition in memory storing data/information that can be referenced. The partition in memory may be contiguous or distributed.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
   storing, in a memory, a data structure comprising:
      a plurality of delivery schedule tables, and
      a mapping of each of a plurality of products sold on an e-commerce platform to a respective one of the plurality of delivery schedule tables,
      wherein each of the plurality of delivery schedule tables corresponds to a respective category, of a plurality of categories, to which multiple ones of the plurality of products map, and wherein each entry of each of the plurality of delivery schedule tables stores pre-computed delivery schedule information, for the respective category, for each destination of a plurality of destinations;
   receiving, from a user device over a network during an online interaction by a user with the e-commerce platform, a request for web content associated with a particular product of the plurality of products sold on the e-commerce platform; and
   replying to the request during the online interaction in real time, the replying comprising:
      obtaining, from the request for web content, information related to a delivery destination associated with the user device and an identifier that uniquely identifies the particular product;
      identifying a particular delivery schedule table, of the plurality of delivery schedule tables in the memory, to which the particular product maps based on the identifier, wherein the particular delivery schedule table corresponds to a particular category of the particular product;
      extracting delivery schedule information and from a particular entry of the particular delivery schedule table that corresponds to the delivery destination; based on the delivery schedule information extracted from the particular entry, generating an indication including delivery time information relating to the particular product;
      incorporating the indication into the web content; and
      transmitting the web content over the network for display on the user device.

2. The computer-implemented method of claim 1, wherein a total number of the plurality of delivery schedule tables is less than a total number of the plurality of products sold on the e-commerce platform.

3. The computer-implemented method of claim 1, wherein the replying occurs within a timing constraint associated with providing the web content during a user's real-time online interaction with the e-commerce platform.

4. The computer-implemented method of claim 1, wherein the information related to the delivery destination associated with the user device is an Internet Protocol address of the user device.

5. The computer-implemented method of claim 1, wherein:
   the extracting comprises: using the identifier to consult the mapping of each of the plurality of products to a respective one of the plurality of delivery schedule tables, to determine a delivery schedule table of the plurality of delivery schedule tables that corresponds with the particular product, and using the delivery destination to extract the delivery schedule information from the delivery schedule table.

6. The computer-implemented method of claim 1, wherein different delivery schedule tables correspond to different product characteristic categories.

7. The computer-implemented method of claim 6, wherein the different product characteristic categories include different weight categories, each of the weight categories defining a different weight range.

8. The computer-implemented method of claim 1, wherein different delivery schedule tables correspond to different fulfillment center location categories.

9. The computer-implemented method of claim 1, wherein the plurality of delivery schedule tables and the mapping are updated to reflect a current version of the plurality of delivery schedule tables and a current version of the mapping, and wherein the update of the delivery schedule tables occurs at a different frequency from the update of the mapping.

10. The computer-implemented method of claim 9, wherein at least one of the plurality of delivery schedule tables is updated in response to expired delivery time information, and wherein the mapping is updated in response to a particular inventory change.

11. The computer-implemented method of claim 10, wherein in response to inventory for a given product at a particular fulfillment center dropping to zero or dropping below a threshold, the mapping is updated to no longer map the given product to the respective delivery schedule table to which the given product was mapped.

12. The computer-implemented method of claim 11, wherein the given product is instead mapped to a different delivery schedule table.

13. A system comprising:
   at least one processor; and
   a memory storing processor-executable instructions that, when executed, cause the at least one processor to:
      store, in the memory, a data structure comprising:
         a plurality of delivery schedule tables, and a mapping of each of a plurality of products sold on an e-commerce platform to a respective one of the plurality of delivery schedule tables,
wherein each of the plurality of delivery schedule tables corresponds to a respective category, of a plurality of categories, to which multiple ones of a plurality of products map, and wherein each entry of each of the plurality of delivery schedule tables stores pre-computed delivery schedule information, for the respective category, for each destination of a plurality of destinations;
receive, from a user device over a network during an online interaction by a user with the e-commerce platform, a request for web content associated with a particular product of the plurality of products sold on the e-commerce platform; and
reply to the request during the online interaction in real time, wherein the step of replying comprises:
obtaining, from the request for web content, information related to a delivery destination associated with the user device and an identifier that uniquely identifies the particular product;
identifying a particular delivery schedule table, of the plurality of delivery schedule tables in the memory, to which the particular product maps based on the identifier, wherein the particular delivery schedule table corresponds to a particular category of the particular product;
extracting delivery schedule information from a particular entry of the particular delivery schedule table that corresponds to the delivery destination;
based on the delivery schedule information extracted from the particular entry, generate an indication including delivery time information relating to the particular product;
incorporating the indication into the web content; and
transmitting the web content over the network for display on the user device.

14. The system of claim 13, wherein a total number of the plurality of delivery schedule tables is less than a total number of the plurality of products sold on the e-commerce platform.

15. The system of claim 13, wherein the step of replying occurs within a timing constraint associated with providing the web content during a user's real-time online interaction with the e-commerce platform.

16. The system of claim 13, wherein:
the step of extracting comprises: using the identifier to consult the mapping of each of the plurality of products to a respective one of the plurality of delivery schedule tables, to determine a delivery schedule table of the plurality of delivery schedule tables that corresponds with the particular product, and using the delivery destination to extract the delivery schedule information from the delivery schedule table.

17. The system of claim 13, wherein different delivery schedule tables correspond to different product characteristic categories.

18. The system of claim 13, wherein the plurality of delivery schedule tables and the mapping are updated to reflect a current version of the plurality of delivery schedule tables and a current version of the mapping, and wherein the update of the delivery schedule tables occurs at a different frequency from the update of the mapping.

19. The system of claim 13, wherein the information related to the delivery destination associated with the user device is an Internet Protocol address of the user device.

20. The system of claim 13, wherein different delivery schedule tables correspond to different fulfillment center location categories.

21. The system of claim 13, wherein the plurality of delivery schedule tables and the mapping are updated to reflect a most current version of the plurality of delivery schedule tables and a most current version of the mapping, and wherein the update of the delivery schedule tables occurs at a different frequency from the update of the mapping.

22. The system of claim 21, wherein at least one of the plurality of delivery schedule tables is updated in response to expired delivery time information, and wherein the mapping is updated in response to a particular inventory change.

23. A non-transitory computer readable medium having stored thereon computer-executable instructions that, when executed by a computer, cause the computer to perform operations comprising:
storing, in a memory, a data structure comprising:
a plurality of delivery schedule tables, and
a mapping of each of a plurality of products sold on an e-commerce platform to a respective one of the plurality of delivery schedule tables,
wherein each of the plurality of delivery schedule tables corresponds to a respective category, of a plurality of categories, to which multiple ones of a plurality of products map and wherein each entry of each of the plurality of delivery schedule tables stores pre-computed delivery schedule information, for the respective category, for each destination of a plurality of destinations;
receiving, from a user device over a network during an online interaction by a user with the e-commerce platform, a request for web content associated with a particular product of the plurality of products sold on the e-commerce platform; and
replying to the request during the online interaction in real time, the replying comprising:
obtaining, from the request for web content, information related to a delivery destination associated with the user device and an identifier that uniquely identifies the particular product;
identifying a particular delivery schedule table, of the plurality of delivery schedule tables in the memory, to which the particular product maps based on the identifier, wherein the particular delivery schedule table corresponds to a particular category of the particular product;
extracting delivery schedule information from a particular entry of the particular delivery schedule table that corresponds to the delivery destination;
based on the delivery schedule information extracted from the particular entry, generating an indication including delivery time information relating to the particular product;
incorporating the indication into the web content; and
transmitting the web content over the network for display on the user device.

* * * * *